B. & W. JOHNSON.
Cutter Bar for Harvesters.
No. 93,448.
Patented Aug. 10, 1869.
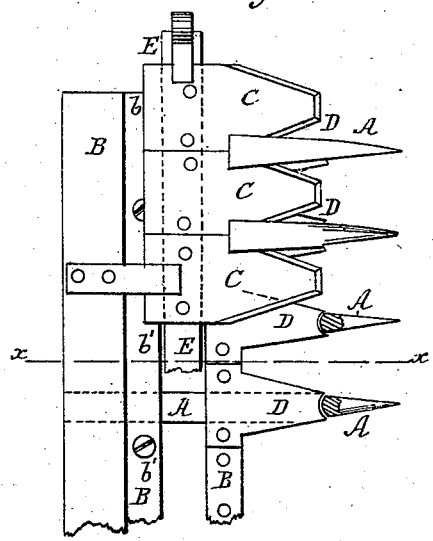
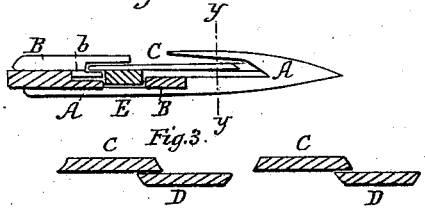
Witnesses.
Chas. Nida
O. Hinchman
Inventor.
B. Johnson
W. Johnson,
per Munn & Co.
Attys.

UNITED STATES PATENT OFFICE.

BENJAMIN JOHNSON, OF CARROLLTON, AND WILLIAM JOHNSON, OF HANOVER, OHIO.

IMPROVED CUTTER-BAR FOR HARVESTERS.

Specification forming part of Letters Patent No. 93,448, dated August 10, 1869.

*To all whom it may concern:*

Be it known that we, B. JOHNSON, of Carrollton, in the county of Carroll and State of Ohio, and W. JOHNSON, of Hanover, in the county of Columbiana and State of Ohio, have invented a new and useful Improvement in Cutter-Bars for Mowers and Reapers; and we do hereby declare that the following is a full, clear, and exact description thereof, which will enable others skilled in the art to make and use the same, reference being had to the accompanying drawings, forming part of this specification, in which—

Figure 1 is a top view of a part of a cutter-bar to which our improvement has been attached. Fig. 2 is a detail sectional view of the same taken through the line $x\,x$, Fig. 1. Fig. 3 is a detail cross-section of the cutters taken through the line $y\,y$, Fig. 2.

Similar letters of reference indicate corresponding parts.

Our invention has for its object to improve the construction of the cutter-bars of reaping and mowing machines, so as to make them cut more freely, run easier, and be less liable to become choked or clogged than when constructed in the ordinary manner, and which will allow the cutters to be conveniently dressed or sharpened when desired; and it consists in the construction and combination of various parts, as hereinafter more fully described.

A are the guards, which are securely attached to the cutter-bar B, and which are slotted to receive the cutters or sickles C in the ordinary manner.

D are cutters, which are made in the shape of ordinary cutters, except that their forward ends may be concaved to fit upon the solid part of the guards A, as shown in Fig. 1. The cutters D are securely attached to the foward part of the bar B in front of the groove in which the sickle-bar E works.

C are the ordinary sickles, which are securely attached to the sickle-bar E, and which are made in the usual manner, except that they are made longer, so that their rear ends may project over the part of the bar B in the rear of the groove in which the sickle-bar E works.

The part $b'$ of the cutter-bar B, upon which the rear ends of the cutters C rest, is made detachable and adjustable, being held in place upon the other part of the said bar B by screws, as shown in Fig. 1.

By this construction, by loosening the said screws and placing a suitable packing beneath the bar $b'$, the rear ends of the cutters C will be raised, depressing their forward ends so as to compensate for their wear, and keep the forward or cutting parts of said cutters pressed closely together.

It will be observed that the side or cutting edges of the cutters D project beyond the sides of the guards A, so that they may be conveniently dressed or sharpened without removing them from the machine.

Having thus described our invention, what we claim as new, and desire to secure by Letters Patent, is—

1. The stationary cutters D, having their forward ends concave, the bar B, provided with the adjustable part $b'$, the cutters C, sickle-bar E, when all combined and arranged with the guards A, as herein shown and described, for the purpose specified.

2. The cutters or sickles C, extended in the rear of the sickle-bar E, in combination with the adjustable part $b'$ of the bar B, substantially as herein shown and described, and for the purpose set forth.

BENJN. JOHNSON.
WILLIAM JOHNSON.

Witnesses:
B. F. MARSH,
JOEL WINDER.